US010369503B2

(12) United States Patent
Prasad et al.

(10) Patent No.: US 10,369,503 B2
(45) Date of Patent: Aug. 6, 2019

(54) PARTICLE SEPARATION SYSTEM

(71) Applicant: Hamilton Sundstrand Corporation, Windsor Locks, CT (US)

(72) Inventors: Dilip Prasad, North Granby, CT (US); Harold W. Hipsky, Willington, CT (US); Thomas M. Zywiak, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 405 days.

(21) Appl. No.: 15/176,970

(22) Filed: Jun. 8, 2016

(65) Prior Publication Data

US 2017/0354908 A1 Dec. 14, 2017

(51) Int. Cl.

| | |
|---|---|
| ***B01D 46/00*** | (2006.01) |
| ***B01D 45/06*** | (2006.01) |
| ***B01D 45/12*** | (2006.01) |
| ***B01D 45/02*** | (2006.01) |
| ***B01D 45/04*** | (2006.01) |
| ***B01D 45/16*** | (2006.01) |
| ***B64D 13/00*** | (2006.01) |
| *B01D 53/26* | (2006.01) |

(52) U.S. Cl.

CPC ............ *B01D 45/06* (2013.01); *B01D 45/02* (2013.01); *B01D 45/04* (2013.01); *B01D 45/12* (2013.01); *B01D 45/16* (2013.01); *B64D 13/00* (2013.01); *B01D 53/26* (2013.01)

(58) Field of Classification Search

CPC ........ B01D 45/06; B01D 45/16; B01D 45/12; B01D 45/02; B01D 45/04; B01D 53/26; B64D 13/00

See application file for complete search history.

(56) References Cited

U.S. PATENT DOCUMENTS

| | | | | |
|---|---|---|---|---|
| 2,047,568 A * | 7/1936 | Lissman | B01D 45/12 | 209/133 |
| 2,221,385 A * | 11/1940 | Rogers | B01D 45/02 | 209/143 |
| 2,468,607 A * | 4/1949 | Schneible | B07B 7/02 | 55/398 |

(Continued)

FOREIGN PATENT DOCUMENTS

| | | |
|---|---|---|
| EP | 2584168 A2 | 4/2013 |
| WO | 2016032585 A2 | 3/2016 |

OTHER PUBLICATIONS

Search Report dated Oct. 23, 2017 in U310776EP, EP Application No. 17174976.5, 8 pages.

*Primary Examiner* — Dung H Bui

(74) *Attorney, Agent, or Firm* — Cantor Colburn LLP

(57) ABSTRACT

A particle separation device to remove particulate matter from an exterior air flow for use with an environmental control system includes a curved airflow path with an inner radius and an outer radius, the curved air flow path to receive the exterior air flow, a particle passage disposed along at least one of the inner radius and the outer radius to receive the particulate matter from the exterior air flow, a circumferential volute to receive the particulate matter from the particle passage, and a duct to transport the particulate matter from the circumferential volute to a downstream region.

15 Claims, 3 Drawing Sheets

(56) References Cited

U.S. PATENT DOCUMENTS

| | | | | | |
|---|---|---|---|---|---|
| 3,199,270 | A * | 8/1965 | Oehlrich | B01D 45/12 | 96/372 |
| 3,320,729 | A * | 5/1967 | Stahl | B01D 45/12 | 55/461 |
| 3,509,932 | A * | 5/1970 | Chambers | B01D 3/06 | 159/13.1 |
| 3,710,561 | A * | 1/1973 | Garrone | B01D 45/16 | 55/429 |
| 4,111,671 | A * | 9/1978 | Williamson | B01D 45/16 | 55/461 |
| 4,179,273 | A | 12/1979 | Montusi | | |
| 4,292,050 | A | 9/1981 | Linhardt et al. | | |
| 4,456,458 | A * | 6/1984 | Gilbertson | B01D 45/04 | 244/53 B |
| 5,261,242 | A | 11/1993 | Lardinois | | |
| 9,199,248 | B2 | 12/2015 | Au et al. | | |
| 2009/0139398 | A1 * | 6/2009 | Sheoran | B01D 45/04 | 95/12 |
| 2010/0005763 | A1 * | 1/2010 | Bloom | B01D 45/12 | 55/315.1 |
| 2014/0076159 | A1 * | 3/2014 | Judd | B01D 45/04 | 95/271 |
| 2014/0144123 | A1 * | 5/2014 | Judd | B01D 45/04 | 60/39.092 |
| 2014/0250625 | A1 * | 9/2014 | Huang | B01D 45/00 | 15/353 |
| 2015/0166186 | A1 | 6/2015 | Zywiak et al. | | |
| 2016/0045923 | A1 | 2/2016 | Correia et al. | | |

* cited by examiner

PARTICLE SEPARATION SYSTEM

BACKGROUND

The subject matter disclosed herein relates to particle separation systems, and more particularly, to particle separation systems for use with aircraft environmental control systems.

Environmental control systems utilized within an aircraft may employ exterior air flow to cool the working fluid of the environmental control system. Heat exchangers and fans may be utilized to allow exterior air flow to remove heat from the working fluid. It is preferable for these heat exchangers utilize a particle free air flow to prevent fouling and maintain desired levels of heat transfer.

BRIEF SUMMARY

According to an embodiment, a particle separation device to remove particulate matter from an exterior air flow for use with an environmental control system includes a curved airflow path with an inner radius and an outer radius, the curved air flow path to receive the exterior air flow, a particle passage disposed along at least one of the inner radius and the outer radius to receive the particulate matter from the exterior air flow, a circumferential volute to receive the particulate matter from the particle passage, and a duct to transport the particulate matter from the circumferential volute to a downstream region.

According to an embodiment, a particle separation system to remove particulate matter from an exterior air flow for use with an environmental control system includes a fan to accelerate the exterior air flow, a curved airflow path with an inner radius and an outer radius, the curved air flow path to receive the exterior air flow, a heat exchanger to receive the exterior air flow from the curved air flow path, a particle passage disposed along at least one of the inner radius and the outer radius to receive the particulate matter from the exterior air flow, a circumferential volute to receive the particulate matter from the particle passage, and a duct to transport the particulate matter from the circumferential volute to a downstream region disposed downstream of the heat exchanger.

Technical function of the embodiments described above includes the curved air flow path to receive the exterior air flow, a particle passage disposed along the outer radius to receive the particulate matter from the exterior air flow, a circumferential volute to receive the particulate matter from the particle passage, and a duct to transport the particulate matter from the circumferential volute to a downstream region.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
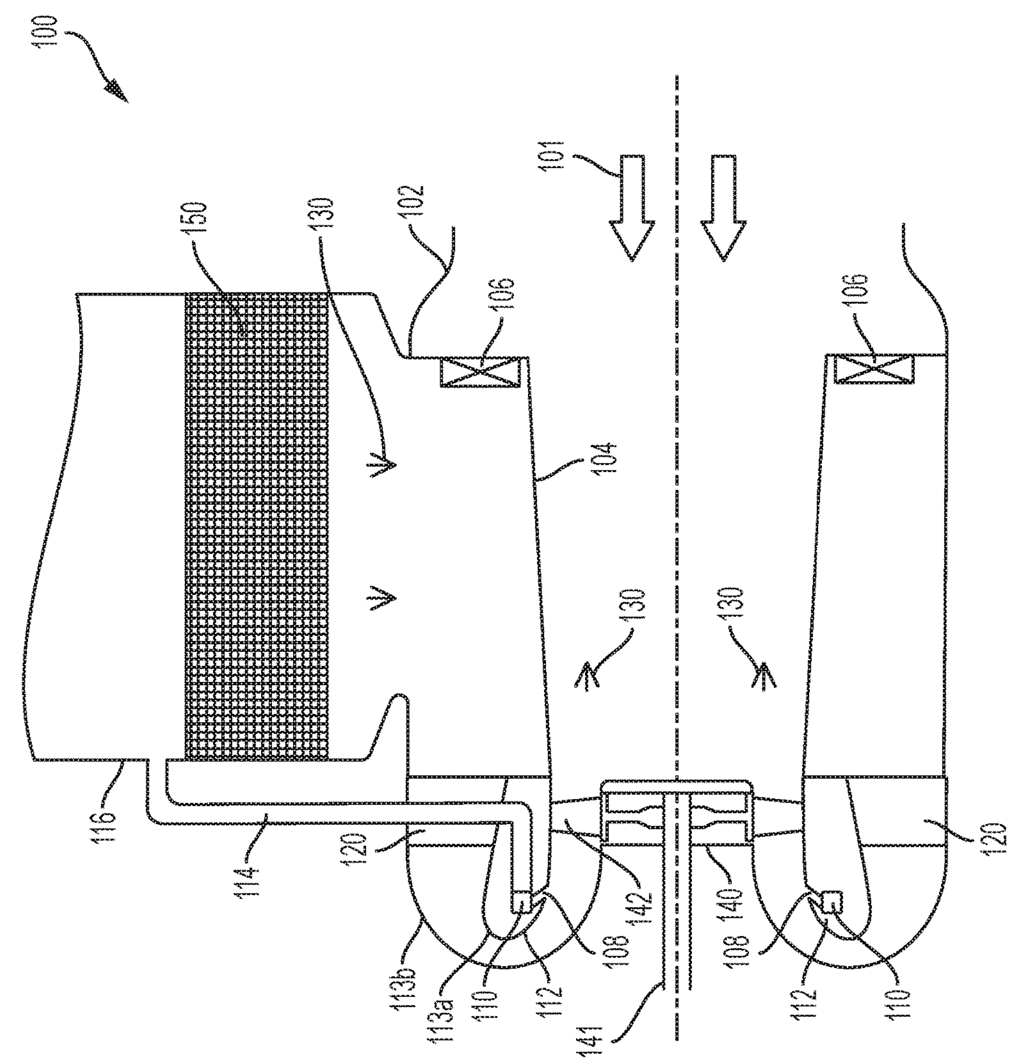
FIG. 1 is a schematic view of one embodiment of a particle separation system.

Referring to FIG. 1 a particle separation system 100 is shown. In the illustrated embodiment, the particle separation system 100 includes a fan housing 102, a particle passage 108, a circumferential volute 110, a duct 114, and a heat exchanger 150. The particle separation system 100 can be utilized to remove particles and debris from an exterior air flow 101 before the exterior air flow 101 flows through the heat exchanger 150. Advantageously, the use of the particle separation system 100 can prevent heat exchanger 150 fouling and reduce or eliminate the need to clean the heat exchanger 150.

In the illustrated embodiment, the fan housing 102 can be disposed on an aircraft body to receive exterior air flow 101. The fan housing 102 may guide the exterior air flow 101 into the contracting passage 104 of the particle separation system 100. In certain embodiments, struts 120 can provide structural support to the fan housing 102.

During ground and low speed operations, exterior air flow 101 may be directed into the contracting passage 104 to be accelerated by the fan 140. In the illustrated embodiment, the exterior air flow 101 can include dirt, debris, dust, particulate matter, etc.

In certain embodiments, sprayers 130 can spray water or other suitable fluid upstream of the fan 140 to cool the exterior air flow 101. The sprayed water may be previously condensed by the environmental control system of the aircraft to reduce the temperature of the exterior air flow 101 by undergoing evaporation. In certain embodiments, the sprayers 130 can be disposed along the walls of the contracting passage 104. In certain embodiments, sprayers 130 can be disposed upstream of the heat exchanger 150 to further depress air temperatures. In other embodiments, the sprayers 130 can be disposed in any suitable location.

In the illustrated embodiment, a fan 140 can be utilized during ground and low aircraft speed operations to draw exterior air flow 101 into the particle separation system 100 and to the heat exchanger 150. In the illustrated embodiment, the fan 140 is driven by a rotating shaft 141 to rotate the fan blades 142. In certain embodiments, the rotating shaft 141 may provide power to the fan 140 from the air cycle machine that comprises a portion of the overall environmental control system. Advantageously, the use of the sprayers 130 upstream of the fan 140 can reduce fan 140 work to lower fan exhaust temperatures, allowing for greater cooling within the heat exchanger 150. In certain embodiments, lower fan 140 temperatures allows for the use of lightweight, inexpensive composite materials such as fiber-reinforced plastic for fan blades 142 as well as for other portions of the fan 140. Further, the use of the relatively straight contracting passage 104 can increase uniformity of the exterior air flow 101, resulting in greater fan 140 efficiency.

During operation, centrifugal force imparted by the fan 140 causes particulate matter within the exterior air flow 101 to segregate toward the outer periphery of the fan blades 142. In the illustrated embodiment, the exterior air flow 101 is directed through the curved air flow path 112. The curved air flow path 112 includes an inner radius 113*a* and an outer radius 113*b*. In the illustrated embodiment, the particulate matter is directed toward the inner radius 113*a* of the curved flow path 112. In certain embodiments, the curved air flow path 112 can direct the exterior air flow 101 up to 180 degrees from the original flow direction, reversing the direction of the exterior air flow 101.

In the illustrated embodiment, particulate matter is captured in the particle passage 108. In the illustrated embodiment, the particle passage 108 is disposed along the inner radius 113*a* of the curved air flow path 112 beyond the fan 140. In the illustrated embodiment, the particle passage 108 can receive particulate matter since the mass of ingested foreign particles is considerably greater than that of the air being pumped causing inertial forces to force the particulate matter away from the air trajectory of the exterior air flow 101 through the curved air flow path 112.

In the illustrated embodiment, particulate matter captured within the particle passage 108 is directed into the circumferential volute 110. From the circumferential volute 110, particulate matter is directed to a downstream region 116 beyond the heat exchanger 150. In the illustrated embodiment, the downstream region 116 is a lower pressure region facilitating the flow of particulate matter away from the curved air flow path 112. Particulate matter is then eliminated overboard by the exterior air flow 101 beyond the heat exchanger 150.

In certain embodiments, bypass valves 106 can be utilized to bypass the fan 140 and the air flow path 112 to allow exterior air flow 101 to directly interact with the heat exchanger 150. The bypass valve 106 may be opened during flight when the fan 140 may be required to a lesser extent to direct air to the heat exchanger 150.

In the illustrated embodiment, the heat exchanger 150 is exposed to the exterior air flow 101. The heat exchanger 150 can allow a fluid within the heat exchanger 150 to be cooled by the exterior air flow 101. Advantageously, the particle separation system 100 allows for particulate matter to be separated and removed in a downstream region 116 of the heat exchanger 150, allowing for greater efficiency.

Figure 2:
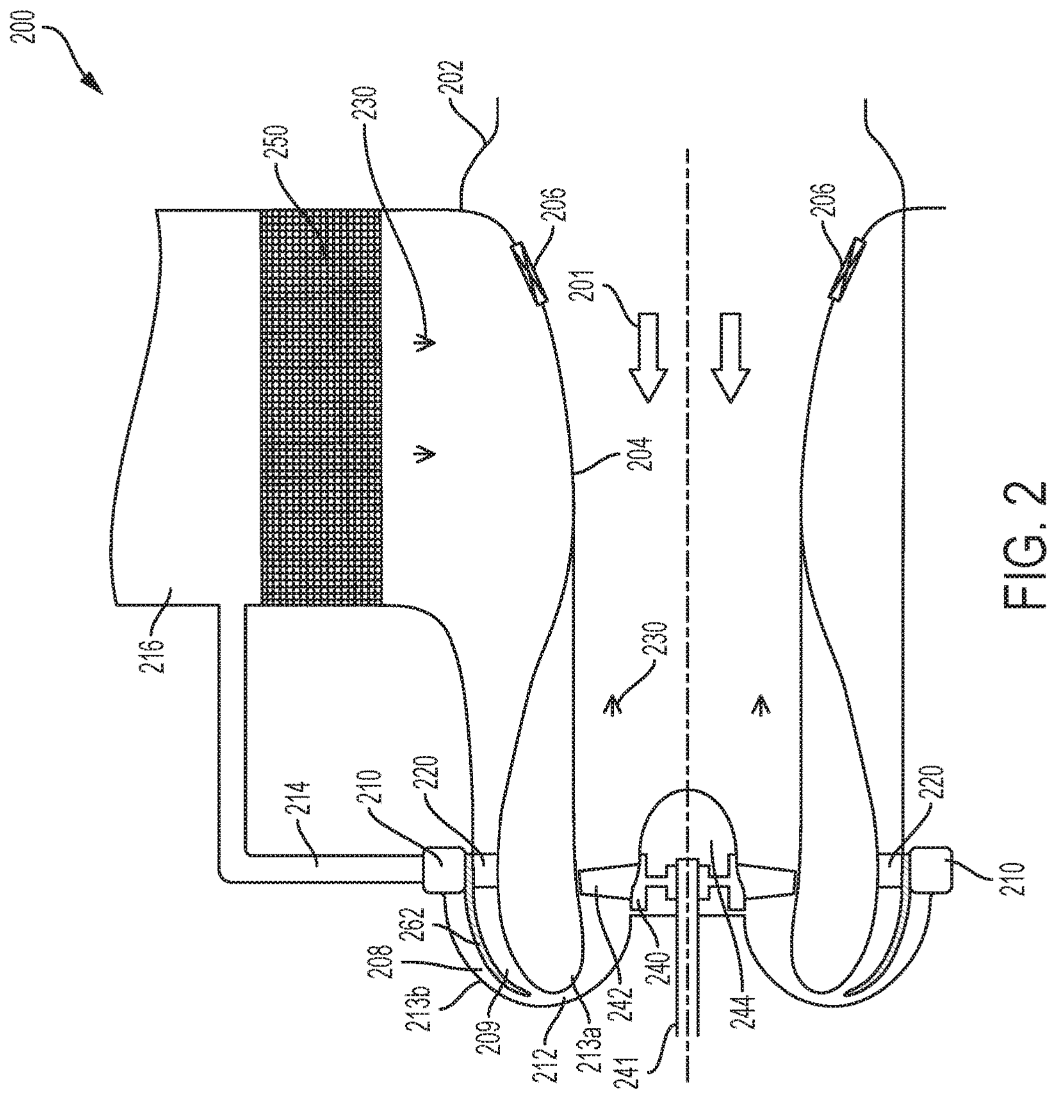
FIG. 2 is a schematic view of another embodiment of a particle separation system.

Referring to FIG. 2, a particle separation system 200 is shown. In the illustrated embodiment, similar numerals represent similar elements as described in FIG. 1. In the illustrated embodiment, the particle separation system 200 further includes a splitter 262 disposed within the curved air flow path 212 to define an inner channel 209 and an outer channel 208.

In the illustrated embodiment, during operation, exterior air flow 201 undergoes significant acceleration within the curved air flow path 212. In the illustrated embodiment, the inner channel 209 is disposed adjacent to the inner radius 213*a*. During operation, the accelerated air flow has a lower inertia allowing the exterior air flow 201 to be directed into the inner channel 209.

In the illustrated embodiment, the outer channel 208 is disposed adjacent to the outer radius 213*b*. Particulate matter is forced toward the outer channel 208. Similarly, the outer channel 208 terminates with a circumferential volute 210, wherein particulate matter is transferred to a downstream region 216 as described in FIG. 1.

Further, in the illustrated embodiment, the fan 240 includes an air flow device 244. In the illustrated embodiment, the air flow device 244 is a spinning aerodynamic device to direct air flow and prevent undesired flow characteristics. In certain embodiments, the air flow device 244 includes an aerodynamically shaped fan hub and casing to provide a convergent flow path along the flow direction.

Figure 3:
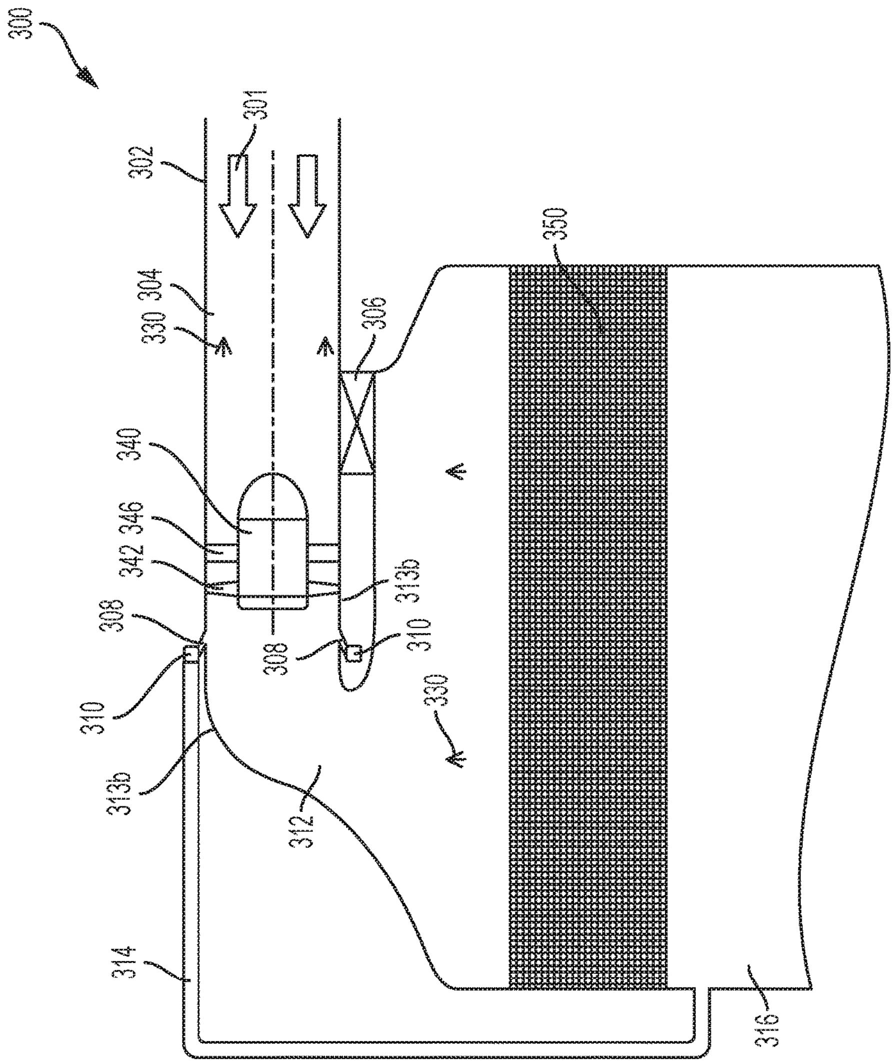
FIG. 3 is a schematic view of another embodiment of a particle separation system.

Referring to FIG. 3, a particle separation system 300 is shown. In the illustrated embodiment, similar numerals represent similar elements as described in FIG. 1. In the illustrated embodiment, the particle separation system 300 utilizes an electric fan 340. Advantageously, the fan body 302 and the flow path 312 can be designed without consideration of a mechanical shaft to drive the fan. Further, the use of an electrical fan 340 upstream of the heat exchanger 350 allows for ease of motor cooling. The fan 340 may be supported by fan struts 346.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A particle separation device to remove particulate matter from an exterior air flow for use with an environmental control system, the particle separation device comprising:

a curved airflow path with an inner radius and an outer radius, the curved air flow path to receive the exterior air flow;

a particle passage disposed along at least one of the inner radius and the outer radius to receive the particulate matter from the exterior air flow;

a circumferential volute to receive the particulate matter from the particle passage; and a duct to transport the particulate matter from the circumferential volute to a downstream region, wherein:

the exterior air flow moves in a first predominant direction, and the curved airflow path redirects a portion of the exterior air flow, which is not received in the particle passage, such that the portion of the exterior air flow exits the curved airflow path in a second predominant direction opposite the first predominant direction for reception in the downstream region wherein: the duct comprises a first axial component extending from the circumferential volute, a radial component extending from an end of the first axial component and a second axial component extending from an end of the radial component to a first portion of the downstream region, the curved airflow path redirects the exterior air flow approximately 180 degrees into a second portion of the downstream region, and a heat exchanger is interposed between the first and second portions of the downstream region.

2. The particle separation device of claim 1, wherein the particle separation device is disposed upstream of a heat exchanger.

3. The particle separation device of claim 2, wherein the downstream region is downstream of the heat exchanger.

4. The particle separation device of claim 1, wherein the particle separation device is disposed downstream of a fan.

5. The particle separation device of claim 1, further comprising a bypass valve to direct the exterior air flow beyond the curved air flow path.

6. The particle separation device of claim 1, further comprising a contracting passage to direct the exterior air flow to the curved air flow path.

7. The particle separation device of claim 1, further comprising at least one sprayer to spray a liquid into the exterior air flow.

8. A particle separation system to remove particulate matter from an exterior air flow for use with an environmental control system, the particle separation system comprising:

a fan to accelerate the exterior air flow;

a curved airflow path with an inner radius and an outer radius, the curved air flow path to receive the exterior air flow;

a heat exchanger to receive the exterior air flow from the curved air flow path;

a particle passage disposed along at least one of the inner radius and the outer radius to receive the particulate matter from the exterior air flow;

a circumferential volute to receive the particulate matter from the particle passage; and a duct to transport the particulate matter from the circumferential volute to a downstream region disposed downstream of the heat exchanger, wherein:

the exterior air flow moves in a first predominant direction, and the curved airflow path redirects a portion of the exterior air flow, which is not received in the particle passage, such that the portion of the exterior air flow exits the curved airflow path in a second predominant direction opposite the first predominant direction for reception in the downstream region wherein: the duct comprises a first axial component extending from the circumferential volute, a radial component extending from an end of the first axial component and a second axial component extending from an end of the radial component to a first portion of the downstream region, the curved airflow path redirects the exterior air flow approximately 180 degrees into a second portion of the downstream region, and a heat exchanger is interposed between the first and second portions of the downstream region.

9. The particle separation system of claim 8, further comprising a bypass valve to direct the exterior air flow beyond the curved air flow path.

10. The particle separation system of claim 8, further comprising a contracting passage to direct the exterior air flow to the curved air flow path.

11. The particle separation system of claim 8, further comprising at least one sprayer to spray a liquid into the exterior air flow.

12. The particle separation system of claim 11, wherein the at least one sprayer is disposed upstream of the fan.

13. The particle separation system of claim 11, wherein the at least one sprayer is disposed upstream of the heat exchanger.

14. The particle separation system of claim 8, wherein the fan is a shaft powered fan.

15. The particle separation system of claim 8, wherein the fan includes a flow device to direct the exterior air flow.

* * * * *